US011461606B2

(12) United States Patent
Ishiyama

(10) Patent No.: US 11,461,606 B2
(45) Date of Patent: Oct. 4, 2022

(54) SYSTEM THAT ASSOCIATES OBJECT WITH N-DIMENSIONAL SYMBOL

(71) Applicant: NEC Corporation, Tokyo (JP)

(72) Inventor: Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/422,019

(22) PCT Filed: Jan. 29, 2019

(86) PCT No.: PCT/JP2019/002993
§ 371 (c)(1),
(2) Date: Jul. 9, 2021

(87) PCT Pub. No.: WO2020/157831
PCT Pub. Date: Aug. 6, 2020

(65) Prior Publication Data
US 2022/0101077 A1    Mar. 31, 2022

(51) Int. Cl.
*G06K 19/06* (2006.01)
*G06K 7/10* (2006.01)
*G06K 17/00* (2006.01)

(52) U.S. Cl.
CPC ... *G06K 19/06037* (2013.01); *G06K 7/10821* (2013.01); *G06K 17/0019* (2013.01)

(58) Field of Classification Search
None
See application file for complete search history.

(56) References Cited

U.S. PATENT DOCUMENTS

| 10,140,492 B1* | 11/2018 | Nair | G06V 10/56 |
| 2016/0048730 A1* | 2/2016 | Ishiyama | G06V 10/443 382/108 |
| 2017/0286769 A1 | 10/2017 | Di Venuto Dayer et al. | |

(Continued)

FOREIGN PATENT DOCUMENTS

| JP | 2006-340216 A | 12/2006 |
| WO | 2013/039002 A1 | 3/2013 |

(Continued)

OTHER PUBLICATIONS

International Search Report for PCT Application No. PCT/JP2019/002993, dated Mar. 19, 2019.

(Continued)

*Primary Examiner* — Kristy A Haupt

(57) ABSTRACT

A system includes: an acquiring unit that acquires an image of an n-dimensional symbol; a first image capturing unit that captures an image of a random pattern on a surface of an object; a storing unit that stores the image of the n-dimensional symbol and a first image that is the image of the random pattern captured by the first image capturing unit in a manner that the images are associated with each other; a second image capturing unit that captures an image of a random pattern on a surface of an object; a matching unit that performs matching of the image captured by the second image capturing unit against the first image stored by the storing unit; and a displaying unit that displays the image of the n-dimensional symbol associated with the first image stored by the storing unit based on the result of the matching.

15 Claims, 16 Drawing Sheets

(56) References Cited

U.S. PATENT DOCUMENTS

2019/0005326 A1* 1/2019 Kudo ............... G06K 19/10
2019/0384961 A1  12/2019 Kudo et al.

FOREIGN PATENT DOCUMENTS

WO  2014/163015 A1  10/2014
WO  2017/002475 A1   1/2017
WO  2018/150519 A1   8/2018

OTHER PUBLICATIONS

Form PCT/IB345 and Third Party Observation PCT/JP2019/002993, mailed on Jun. 4, 2021.

Alpvision advances security through digital technology, Authentication News, Sep. 2006, vol. 12, No. 9, pp. 7-8.

Ishiyama Rui, Takahashi Toru and Kudo Yuta, Individual Recognition Based on the Fingerprint of Things Expands the applications of IoT, NEC Technical Journal, p. 3-4. vol. 11 No. 1, Dec. 2016, Japan.

* cited by examiner

FIG. 5

34B DATABASE

| QR CODE IMAGE | DOT IMAGE |
|---|---|
| AAA | aaa |
| BBB | bbb |
| CCC | ccc |
| ⋮ | ⋮ |
| NNN | nnn |

SYSTEM THAT ASSOCIATES OBJECT WITH N-DIMENSIONAL SYMBOL

This application is a National Stage Entry of PCT/JP2019/002993 filed on Jan. 29, 2019, the contents of all of which are incorporated herein by reference, in their entirety.

TECHNICAL FIELD

The present invention relates to a system that associates an object with an n-dimensional symbol, a method therefor, and a recording medium.

BACKGROUND ART

For source display, quality control, and distribution control, an object such as a part or a product is associated with an n-dimensional symbol that indicates information about the object. In particular, a QR code (registered trademark), which is one type of n-dimensional symbols, has been actively used in recent years because it has many merits; for example, it can hold a large amount of data as compared with a one-dimensional barcode, and it can be easily read by processing an image captured by a camera.

For example, Patent Document 1 describes a technique to identify individual objects by previously attaching an n-dimensional symbol that indicates information about a target object to the object, extracting the n-dimensional symbol and a matte-finish pattern from an image obtained by capturing the object, acquiring the information about the object from the extracted n-dimensional symbol, and identifying the object from the extracted matte-finish pattern.

On the other hand, another technique to identify individual parts or products is a technique of drawing a dot on a target object with a commercially available ink pen such as a pen containing glitter powder, performing image recognition of a fine pattern inside ink that is difficult to see with naked eyes, and identifying each dot (for example, see Patent Documents 2 and 3).

Patent Document 1: WO/2014-163015
Patent Document 2: WO/2017/002475
Patent Document 3: WO/2018/150519

However, the technique described in Patent Document 1 of extracting an n-dimensional symbol from an image of a target object and acquiring information about the object from the extracted n-dimensional symbol needs an n-dimensional symbol to be attached to an object. Therefore, an object to which an n-dimensional symbol cannot be attached for a reason such as lack of space for attaching an n-dimensional symbol cannot be associated with an n-dimensional symbol. Even if a dot drawn with an ink pen described in Patent Document 2 or Patent Document 3 is used instead of a matte-finish pattern described in Patent Document 1, there is the same problem.

SUMMARY

An object of the present invention is to provide a system that associates an object with an n-dimensional symbol which solves the abovementioned problem; that is, an object to which an n-dimensional symbol cannot be attached cannot be associated with an n-dimensional symbol.

A system that associates an object with an n-dimensional symbol according to an aspect of the present invention includes: an acquiring unit configured to acquire an image of an n-dimensional symbol; a first image capturing unit configured to capture an image of a random pattern on a surface of an object; a storing unit configured to store the image of the n-dimensional symbol and a first image that is the image of the random pattern captured by the first image capturing unit in a manner that the images are associated with each other; a second image capturing unit configured to capture an image of a random pattern on a surface of an object; a matching unit configured to perform matching of the image captured by the second image capturing unit against the first image stored by the storing unit; and a displaying unit configured to display the image of the n-dimensional symbol associated with the first image stored by the storing unit based on a result of the matching.

Further, a method for associating an object with an n-dimensional symbol according to another aspect of the present invention includes: acquiring an image of an n-dimensional symbol; acquiring an image obtained by capturing a random pattern provided on a surface of an object; registering the image of the n-dimensional symbol and a first image that is the image of the pattern in a manner that the images are associated with each other; acquiring an image obtained by capturing a random pattern provided on a surface of an object as a second image; performing matching of the acquired second image against the registered first image; and displaying the registered image of the n-dimensional symbol associated with the first image that matches the acquired second image on a displaying unit.

Further, on a non-transitory computer-readable recording medium according to another aspect of the present invention, a program is recorded. The program includes instructions for causing a computer to execute: a process of acquiring an image of an n-dimensional symbol; a process of acquiring an image obtained by capturing a random pattern provided on a surface of an object; a process of registering the image of the n-dimensional symbol and a first image that is the image of the pattern in a manner that the images are associated with each other; a process of acquiring an image obtained by capturing a random pattern provided on a surface of an object as a second image; a process of matching the acquired second image against the registered first image; and a process of displaying the image of the n-dimensional symbol registered in association with the first image that matches the acquired second image on a displaying unit.

With the configurations described above, the present invention enables associating an object with an n-dimensional symbol even if the object is an object to which an n-dimensional symbol cannot be attached.

BRIEF DESCRIPTION OF DRAWINGS

FIG. 5 is a view showing an example of a content of a database of the server according to the first example embodiment of the present invention;

EXAMPLE EMBODIMENTS

Next, an example embodiment of the present invention will be described in detail with reference to the drawings.

First Example Embodiment

Figure 1:
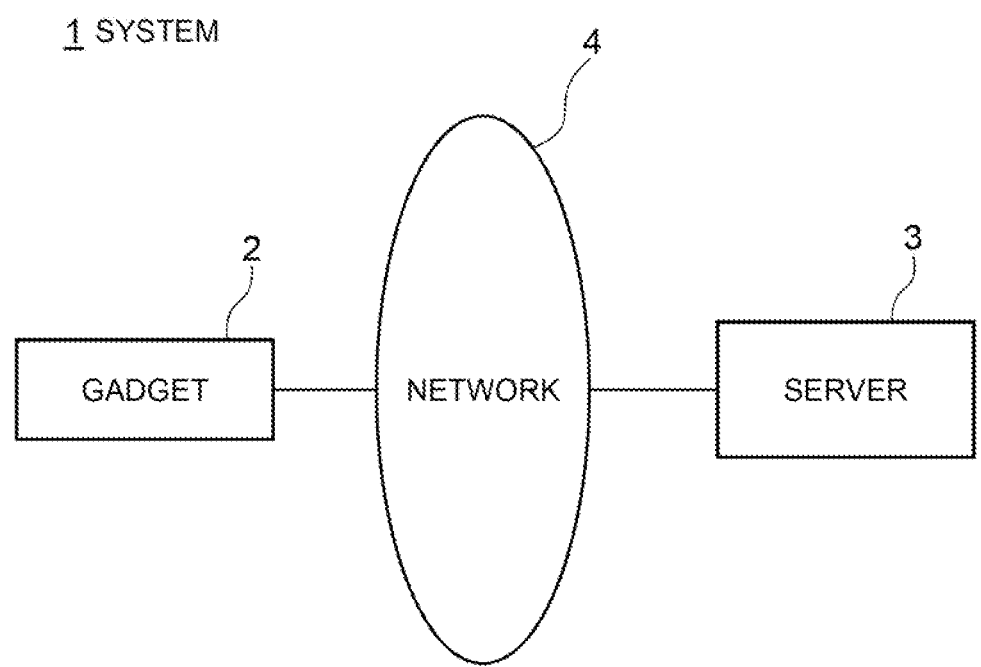
FIG. 1 a block diagram of a system according to a first example embodiment of the present invention.

FIG. 1 is a block diagram of a system according to a first example embodiment of the present invention. A system 1 shown in FIG. 1 is a system that associates an object with an n-dimensional symbol. In this example embodiment, a description will be made using a QR code as an example of an n-dimensional symbol. However, the present invention is not limited to a QR code, and can be applied to any n-dimensional symbol (n is a positive integer of 1 or more).

Referring to FIG. 1, the system 1 includes a gadget 2 and a server 3. The gadget 2 and the server 3 are connected so as to be able to communicate with each other through a network 4 such as the Internet.

Figure 2A:
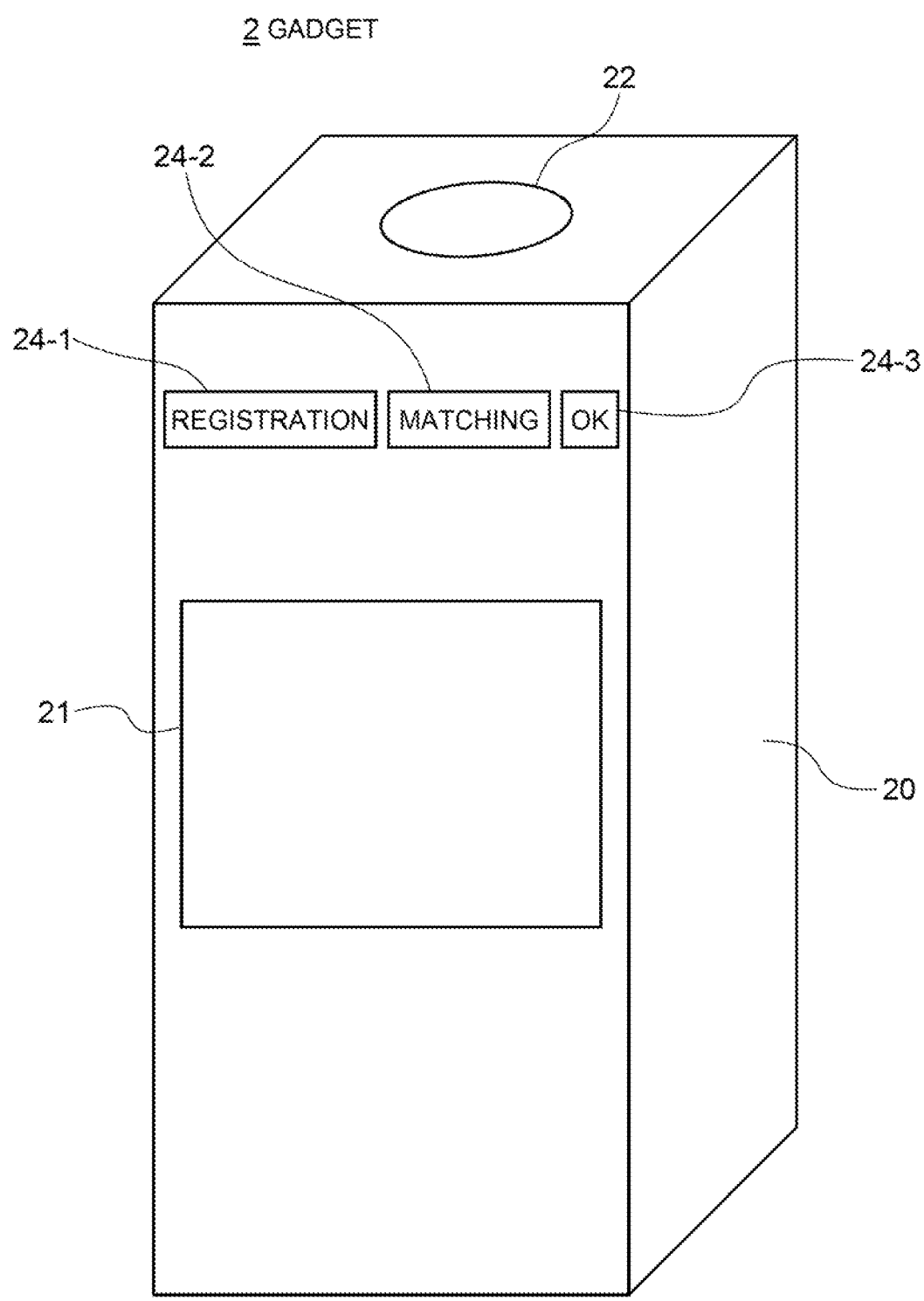
FIG. 2A is an external perspective view of a gadget according to the first example embodiment of the present invention as seen from diagonally above.
Figure 2B:
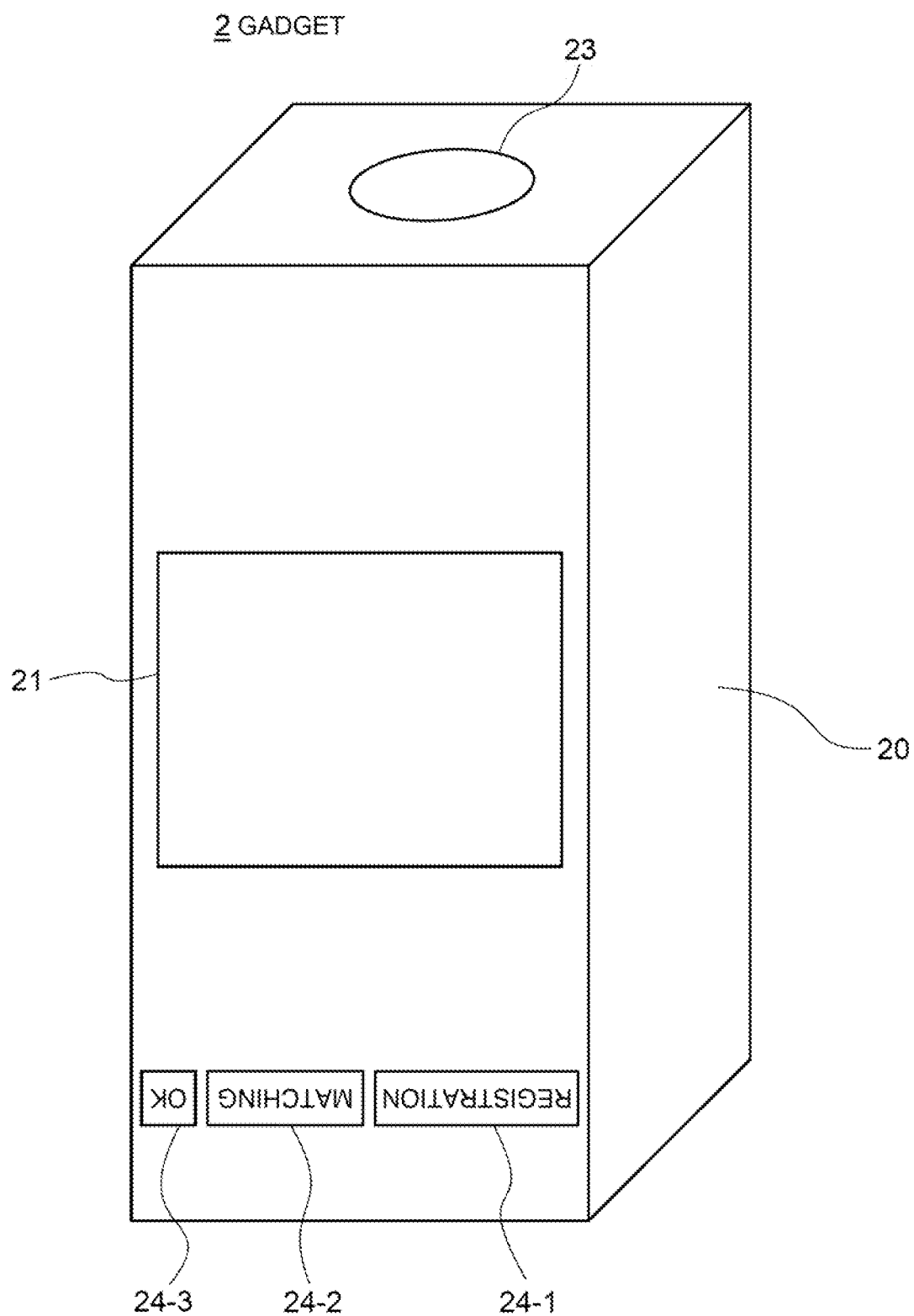
FIG. 2B is an external perspective view of the gadget according to the first example embodiment of the present invention as turned upside down and seen from diagonally above.

The gadget 2 is a portable terminal used by a person to associate an object with a QR code. FIG. 2A is an external perspective view of the gadget 2 as seen from diagonally above. FIG. 2B is an external perspective view of the gadget 2 as turned upside down and seen from diagonally above. Referring to FIG. 2A and FIG. 2B, the gadget 2 includes a housing 20, and a display device 21, cameras 22 and 23, a registration button 24-1, a matching button 24-2, and an OK button 24-3 that are incorporated in the housing 20.

The camera 22 is an image capturing unit (a first image capturing unit) having an image resolution suitable for capturing a QR code. The camera 23 is an image capturing unit (a second image capturing unit) having an image resolution suitable for capturing a random pattern formed by fine particles such as glitter powder of a few tenths of a millimeter or less. The camera 22 is located at one of a pair of opposite ends of the gadget 2, and the camera 23 is located at the other end. However, the arrangement of the cameras 22 and 23 is not limited to the above, and the cameras 22 and 23 may be arranged on any surface of the housing 20.

The display device 21 is composed of a screen display device such as an LCD (Liquid Crystal Display) or a PDP (Plasma Display Panel), and is configured to display images captured by the cameras 22 and 23 and various information such as an operation menu on its screen.

The registration button 24-1 is a control button for switching the processing mode of the gadget 2 to a registration mode and activating. The matching button 24-2 is a control button for switching the processing mode of the gadget 2 to a matching mode and activating. The OK button 24-3 is a control button for confirmation.

Figure 3:
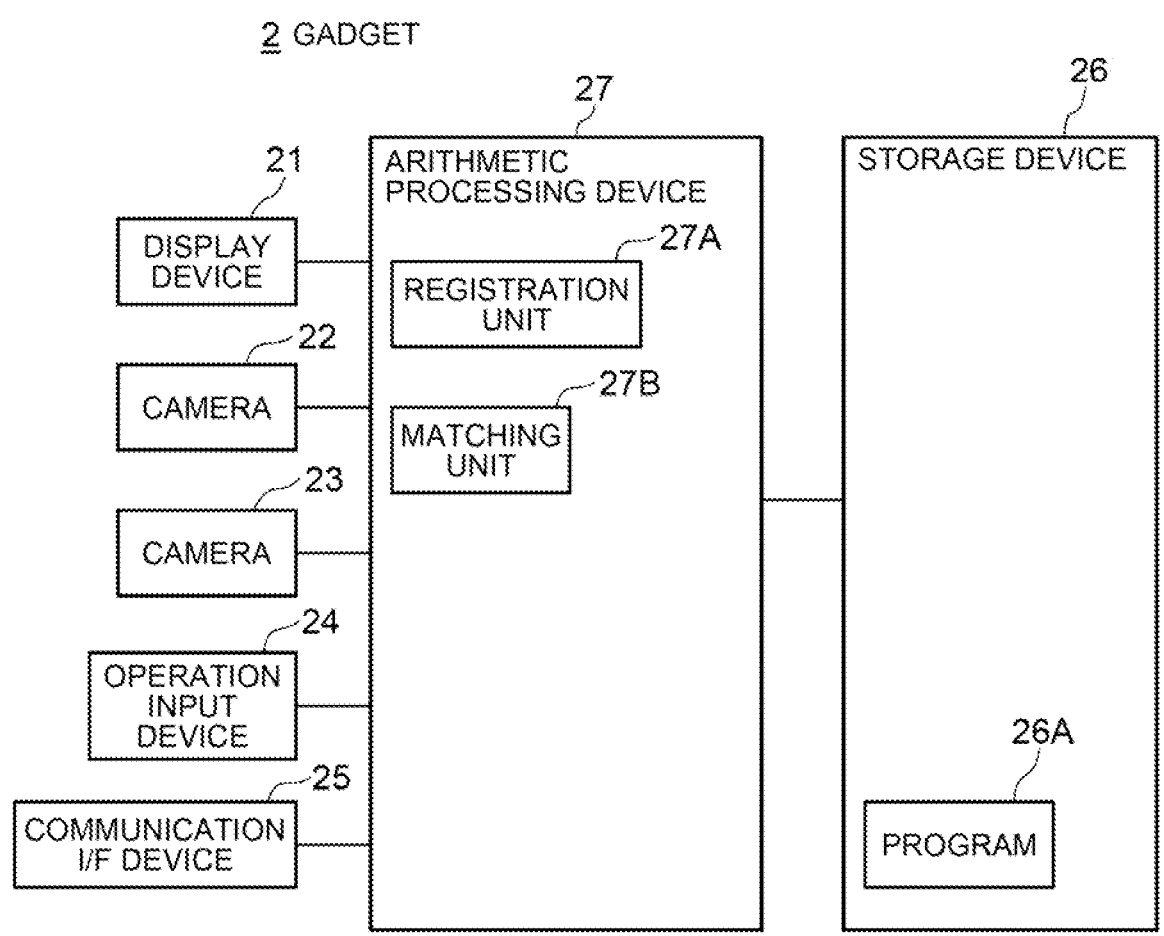
FIG. 3 is a block diagram of the gadget according to the first example embodiment of the present invention.

FIG. 3 is a block diagram of the gadget 2. Referring to FIG. 3, the gadget 2 includes a display device 21, cameras 22 and 23, an operation input device 24, a communication I/F (interface) device 25, a storage device 26, and an arithmetic processing device 27. A power supply that supplies electric power to each of the above components housed in the gadget 2, a power switch, and so on are not shown in the drawings.

The display device 21 and the cameras 22 and 23 are the same as those shown in FIG. 1. The operation input device 24 includes the buttons 24-1 to 24-3 shown in FIG. 1, and is configured to detect an operation by an operator and output to the arithmetic processing device 27. The communication I/F device 25 is composed of a dedicated data communication circuit, and is configured to perform data communication with various devices such as the server 3 connected via a wired or wireless communication line.

The storage device 26 is composed of a storage device such as a hard disk or a memory, and is configured to store processing information and a program 26A required for various kinds of processing in the arithmetic processing device 27. The program 26A is a program loaded to and executed by the arithmetic processing device 27 to realize various processing units, and is previously loaded from an external device (not shown) or a storage medium (not shown) via a data input/output function such as the communication I/F device 25 and stored into the storage device 26.

The arithmetic processing device 27 has a microprocessor such as a CPU and its peripheral circuits, and is configured to load the program 26A from the storage device 26 and execute to make the above hardware and the program 26A cooperate and realize various processing units. Major processing units realized by the arithmetic processing device 27 are a registration unit 27A and a matching unit 27B. The registration unit 27A and the matching unit 27B are also referred to as a terminal-side processing unit.

The registration unit 27A is configured to capture a QR code with the camera 22. Moreover, the registration unit 27A is configured to extract an image of a QR code from an image captured with the camera 22. Moreover, the registration unit 27A is configured to capture a dot having a random pattern drawn on an object with the camera 23. Moreover, the registration unit 27A is configured to extract an image of a dot having a random pattern from an image captured with the camera 23. Moreover, the registration unit 27A is configured to transmit a registration request including the extracted images of the QR code and the dot to the server 3.

The matching unit 27B is configured to capture a dot having a random pattern drawn on an object with the camera 23. Moreover, the matching unit 27B is configured to extract an image of a dot having a random pattern from an image captured with the camera 23. Moreover, the matching unit 27B is configured to transmit a matching request including the extracted image of the dot to the server 3. Moreover, the matching unit 27B is configured to, upon receiving a matching result that is a response to the matching request from the server 3, display an image of a QR code included in the matching result on the display device 21.

Figure 4:
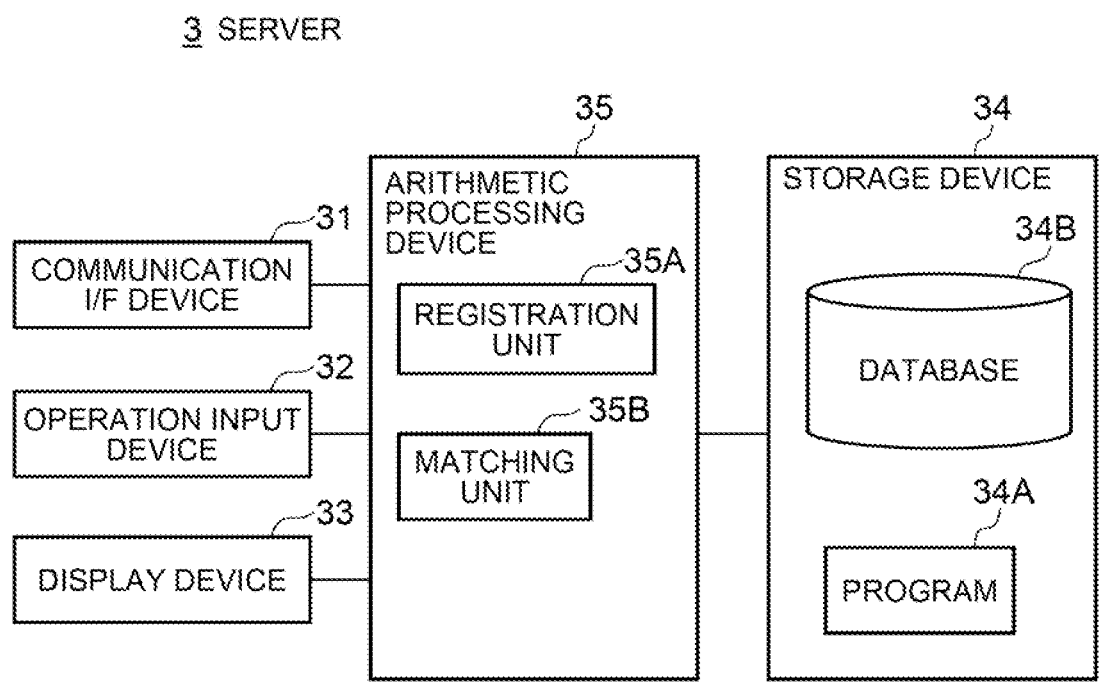
FIG. 4 is a block diagram of a server according to the first example embodiment of the present invention.

FIG. 4 is a block diagram of the server 3. Referring to FIG. 4, the server 3 includes a communication I/F device 31, an operation input device 32, a display device 33, a storage device 34, and an arithmetic processing device 35.

The communication I/F device 31 is composed of a dedicated data communication circuit, and is configured to perform data communication with various devices such as the gadget 2 connected via a wired or wireless communication line. The operation input device 32 is composed of an operation input device such as a keyboard and a mouse, and is configured to detect an operation by an operator and output to the arithmetic processing device 35. The display device 33 is composed of a screen display device such as an LCD or a PDP, and is configured to display various information such as an operation menu on its screen in response to an instruction from the arithmetic processing device 35.

The storage device 34 is composed of a storage device such as a hard disk or a memory, and is configured to store processing information and a program 34A required for various kinds of processing in the arithmetic processing device 35. The storage device 34 may be a cloud storage device that can be used in a cloud computing service. The program 34A is a program that is loaded to and executed by the arithmetic processing device 35 and realizes various processing units, and is previously loaded from an external device (not shown) or a storage medium (not shown) via a data input/output function such as the communication I/F device 31 and stored into the storage device 34. Major processing information stored in the storage device 34 is a database 34B.

The database 34B is configured so that an image of a QR code and an image of a dot having a random pattern are associated and stored therein. FIG. 5 shows an example of information stored in the database 34B. Referring to FIG. 5, the database 34B has a plurality of entries, and an image of a QR code and an image of a dot having a random pattern are associated and stored in each of the entries. For example, in an entry on the first row, a set of a QR code image AAA and a dot image aaa is stored.

The arithmetic processing device 35 has a microprocessor such as a CPU and its peripheral circuits, and is configured to load the program 34A from the storage device 34 and execute the program 34A to make the above hardware and the program 34A cooperate and realize various processing units. Major processing units realized by the arithmetic processing device 35 are a registration unit 35A and a matching unit 35B. The registration unit 35A and the matching unit 35B are also referred to as a server-side processing unit.

The registration unit 35A is configured to associate an image of a QR code and an image of a dot included by a registration request received from the gadget 2 with each other and register.

The matching unit 35B is configured to match an image of a dot included by a matching request received from the gadget 2 against dot images stored in the database 34B. Moreover, the matching unit 35B is configured to transit a matching result including an image of a QR code associated with a matched-up dot image and stored in the database 34B to the gadget 2.

Next, an operation of the system 1 according to this example embodiment will be described. The operation of the system 1 is roughly divided into a registration operation and a matching operation. The registration operation is an operation to capture an image of a QR code to be associated with an object and an image of a dot drawn on the object with an ink pen by an operator by using the cameras 22 and 23, respectively, and associate the images with each other and register into the database 34B of the server 3. The matching operation is an operation to capture an image of a dot drawn on an object with an ink pen by using the camera 23 of the gadget 2, and acquire an image of a QR code associated with the image of the dot from the database 34B of the server 3 and display on the display device 21 of the gadget 2.

Figure 6:
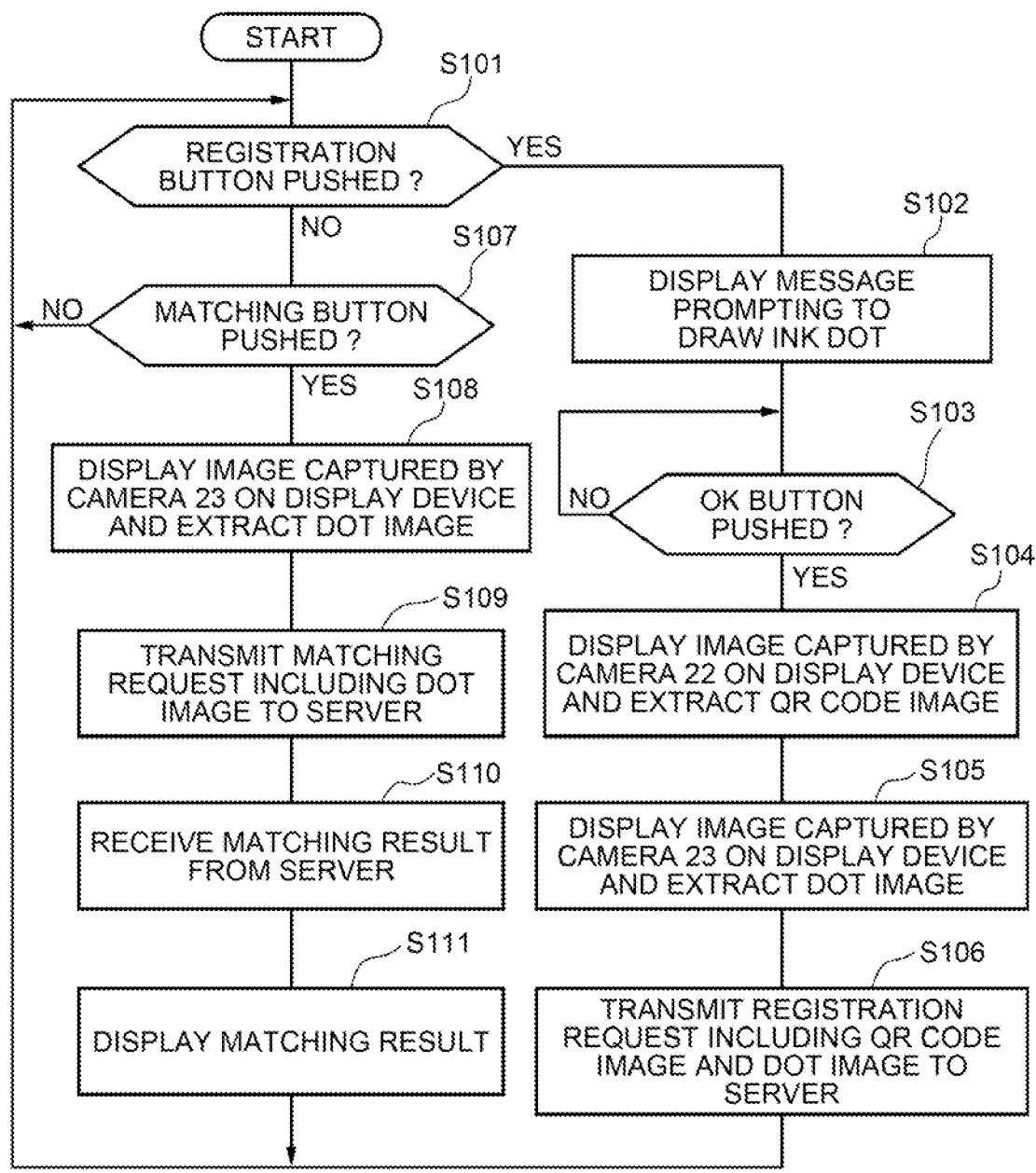
FIG. 6 is a flowchart showing an example of an operation of the gadget according to the first example embodiment of the present invention.
Figure 7:
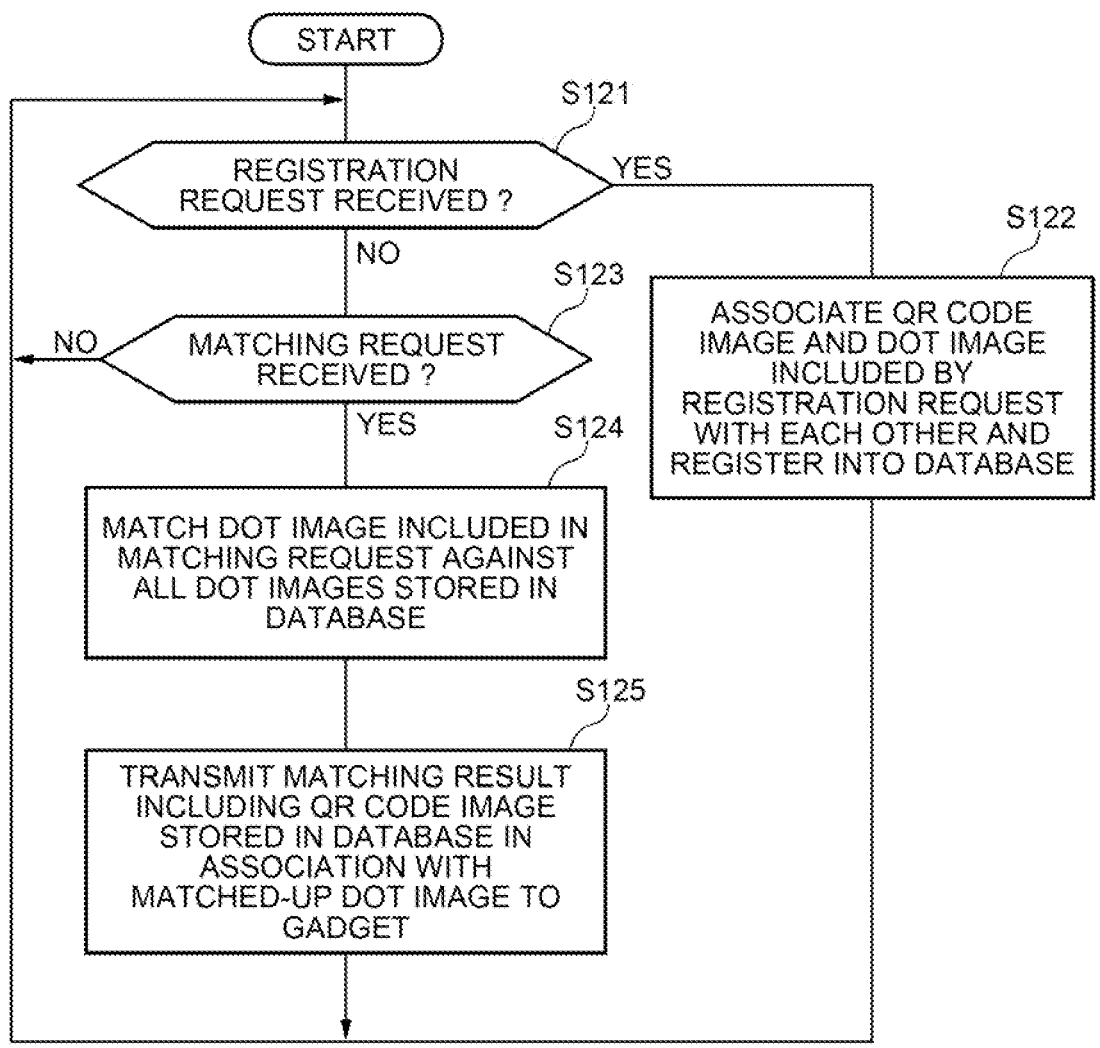
FIG. 7 is a flowchart showing an example of an operation of the server according to the first example embodiment of the present invention.

FIG. 6 is a flowchart showing an example of an operation performed by the gadget 2. FIG. 7 is a flowchart showing an example of an operation performed by the server 3. Below, the registration operation and the matching operation of the system 1 according to this example embodiment will be described with reference to FIGS. 6 and 7.

The registration operation will be described first. When the operator pushes the registration button 24-1 of the gadget 2 (step S101, YES), a process as shown below is started by the registration unit 27A.

Figure 8:
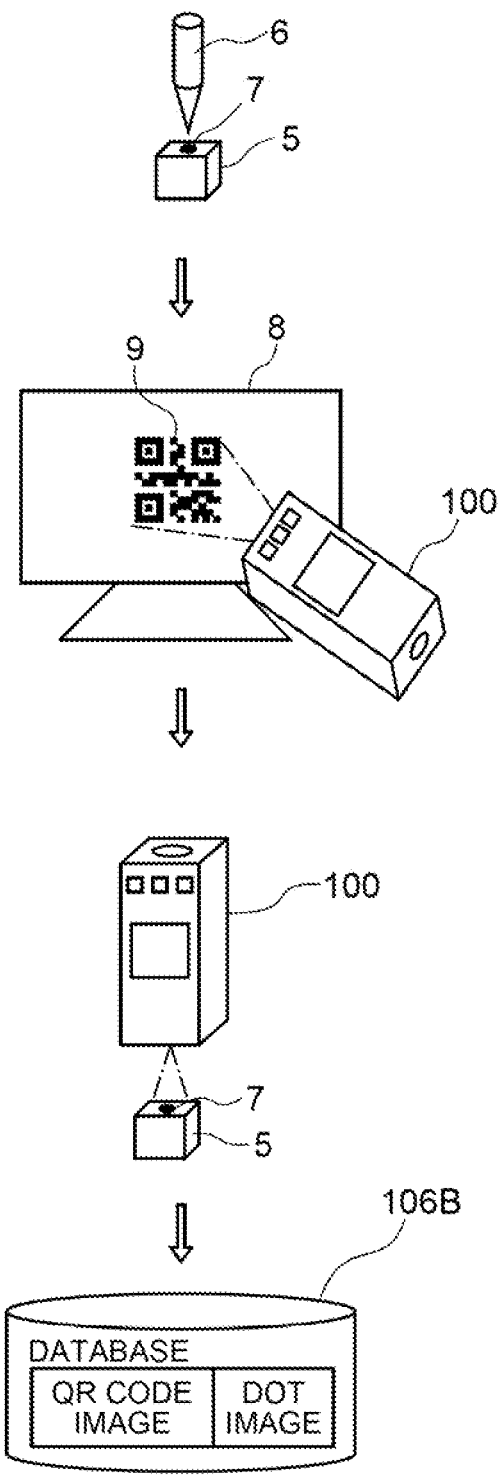
FIG. 8 is a view showing an outline of an operation in a registration mode of the system according to the first example embodiment of the present invention.

First, the registration unit 27A displays a message on the display device 21 prompting to draw a dot on an object to be associated with a QR code by using an ink pen (step S102), and waits for the OK button 24-3 to be pushed (step S103). A specific ink pen such as a commercially available pen including glitter powder is attached to the gadget 2. As shown in FIG. 8, the operator uses an ink pen 6 to draw a dot 7 on the surface of the object 5.

Next, when the operator pushes the OK button 24-3, the registration unit 27A activates the camera 22, displays an image being captured by the camera 22 on a monitor of the display device 21, and extracts an image of a QR code from the captured image (step S104). As a QR code to be associated with the object 5, for example, as shown in FIG. 8, a QR code 9 displayed on the screen of a personal computer 8 can be used. The QR code 9 can be easily created on the personal computer 8 by using software that converts a text or the like into a QR code. As shown in FIG. 8, when the operator turns the camera view of the camera 22 of the gadget 2 to the screen of the personal computer 8, the QR code 9 displayed on the screen of the personal computer is captured by the camera 22, and the image of the QR code 9 is extracted from the captured image by pattern matching.

When finishing extraction of the image of the QR code, the registration unit 27A stops the camera 22, activates the camera 23, displays an image being captured by the camera 23 on the monitor of the display device 21, and extracts an image of a dot drawn with the ink pen from the captured image (step S105). As shown in FIG. 8, when the operator turns the camera view of the camera 23 of the gadget 2 to the dot 7 drawn on the surface of the object 5, the dot 7 is captured by the camera 22, and the image of the dot 7 is extracted from the captured image by pattern matching.

When finishing extraction of the dot image, the registration unit 27A stops the camera 23 and, as shown in FIG. 8, transmits a registration request including the extracted QR code image and dot image is transmitted to the server 3 through the communication I/F device 25 (step S106). After this, the process by the gadget 2 returns to step S101.

When the server 3 receives the registration request from the gadget 2 (step S121, YES), the following process is started by the registration unit 35A. The registration unit 35A associates the QR code image and the dot image included by the registration request with each other and register into the database 34B as shown in FIG. 8 (step S122).

Thus, in the registration mode, an image of the QR code 9 and an image of the dot 7 drawn with the ink pen 6 on the surface of the object 5 are associated with each other and registered into the database 34B.

Next, the matching operation will be described. When the operator pushes the matching button 24-2 of the gadget 2 (step S107, YES), a process as shown below is started by the matching unit 27B.

Figure 9:
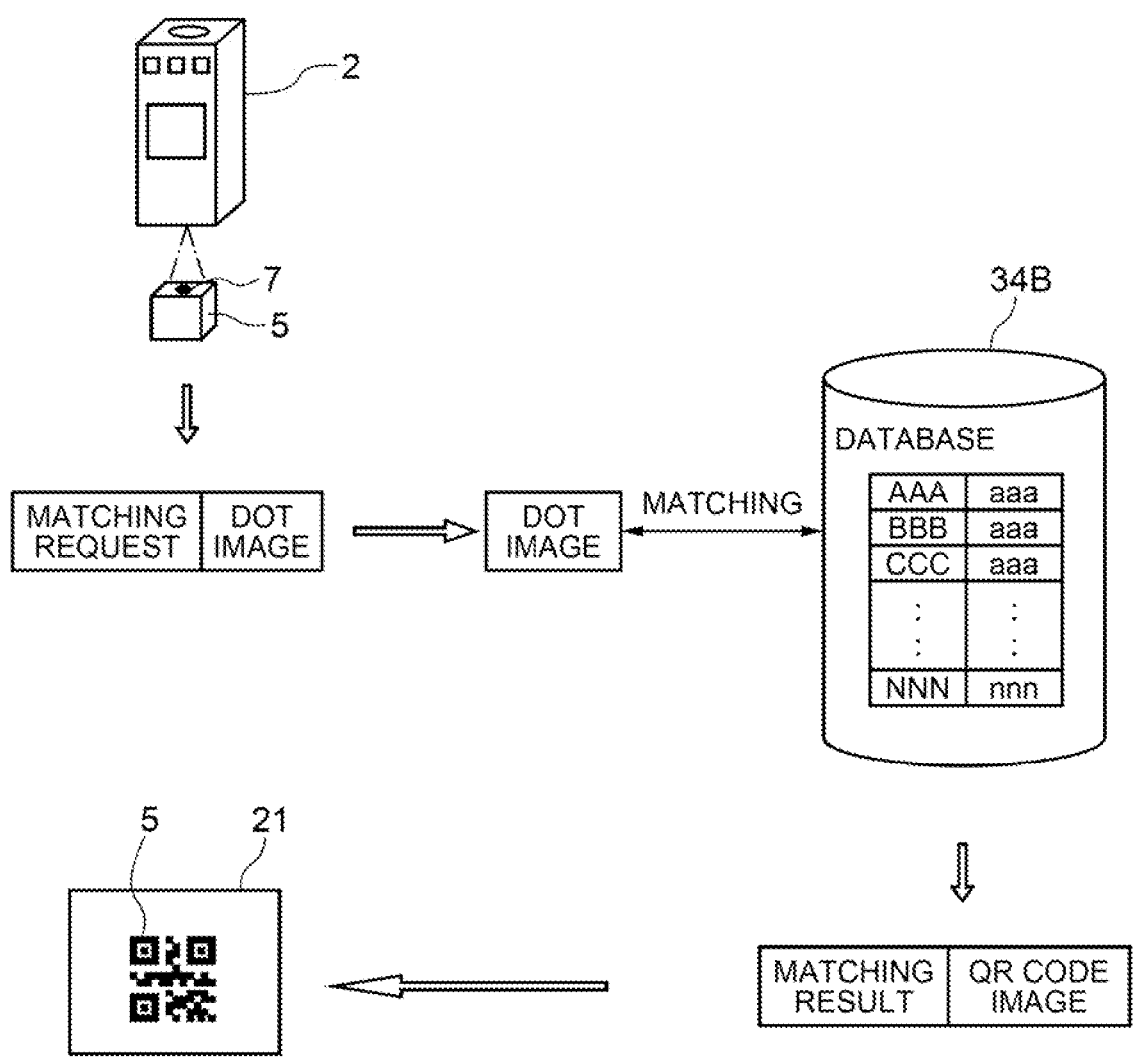
FIG. 9 is a view showing an outline of an operation in a matching mode of the system according to the first example embodiment of the present invention.

First, the matching unit 27B activates the camera 23, displays an image being captured by the camera 23 on the monitor of the display device 21, and extracts an image of a dot drawn with the ink pen from the captured image (step S108). As shown in FIG. 9, when the operator turns the camera view of the camera 23 of the gadget 2 to the dot 7 drawn on the surface of the object 5, the dot 7 is captured with the camera 23, and an image of the dot 7 is extracted from the captured image by pattern matching.

When finishing extraction of the image of the dot 7, the matching unit 27B stops the camera 23 and, as shown in FIG. 9, transmits a matching request including the extracted image of the dot 7 to the server 3 through the communication I/F device 25 (step S109).

When the server 3 receives the matching request from the gadget 2 (step S123, YES), the matching unit 35B starts a process as shown below.

First, as shown in FIG. 9, the matching unit 35B matches the image of the dot 7 included by the matching request against all the dot images stored in the database 34B (step S124). Next, the matching unit 35B extracts an image of the QR code 9 stored in association with a matched-up dot image from the database 34B and, as shown in FIG. 9, transmits a matching result including the image of the QR code 9 to the gadget 2 through the communication I/F device 31 (step S125). In a case where there is no matched-up dot image, the matching unit 35B transmits a matching result indicating mismatch to the gadget 2.

The matching unit 27B of the gadget 2 receives the matching result from the server 3 through the communication I/F device 25 (step S11). Next, as shown in FIG. 9, the matching unit 27B displays the image of the QR code 9 included by the matching result on the display device 21 (step S111). When receiving the matching result indicating mismatch from the server 3, the matching unit 27B displays a message indicating no corresponding QR code on the display device 21, for example, Thus, in the matching mode, the dot 7 on the object 5 is converted into the QR code 9 and displayed on the display device 21 of the gadget 2. Information indicated by the QR code 9 displayed on the display device 21 can be easily read by an existing tool having a function of reading a QR code, such as a smartphone.

As described above, according to this example embodiment, even if the object 5 is an object to which the QR code 9 cannot be attached, it is possible to associate the object 5 with the QR code 9. The reason is that an image of the QR code 9 and an image of the dot 7 drawn with the ink pen 6 on the surface of the object 5 are associated with each other and registered into the database 34B in the registration mode, and the dot 7 on the object 5 is converted into the QR code 9 and displayed on the display device 21 in the matching mode.

Further, according to this example embodiment, since a stable pattern of the dot 7 on the object 5 can be captured, the object 5 and the QR code 9 can be accurately associated with each other. That is to say, immediately after the dot 7 by ink is applied to the object 5 by using the ink pen 6, the ink of the dot 7 has not dried sufficiently, so that a pattern of fine particles such as glitter powder is not stable. If an image of the dot 7 in such an unstable state is registered into a database in the registration mode, it mismatches an image of the same dot in the matching mode where an image of the dot 7 having a stable pattern is input, and it becomes difficult to associate the object 5 with the QR code 9 through the image of the dot 7. On the other hand, in this example embodiment, the registration unit 27A of the gadget 2 displays a message on the display device 21 prompting to draw the dot 7 on the object 5 by using the ink pen 6 (step S102), capture the QR code 9 by using the camera 22 (step S104), and capture the dot 7 by using the camera 23. As a result, because a process of capturing the QR code 9 by using the camera 22 intervenes between a time when the operator draws the dot 7 on the object by using the ink pen 6 in accordance with the prompt message displayed on the display device 21 and a time when the dot 7 is captured by the camera 23, it is possible to prevent the dot 7 from being captured in a state where the ink of the dot 7 has not dried sufficiently. In a case where an operator recognizes the importance of capturing the dot 7 after the ink dries sufficiently, the abovementioned measures are not necessary. In that case, step S105 may be moved before step S104.

Further, according to this example embodiment, a plurality of gadgets 2 can share the database 34B in which images of the QR codes 9 and images of the dots 7 are associated with each other and stored.

Second Example Embodiment

Next, a second example embodiment that enables a gadget alone to associate an object with an n-dimensional symbol will be described with reference to the drawings.

Figure 10:
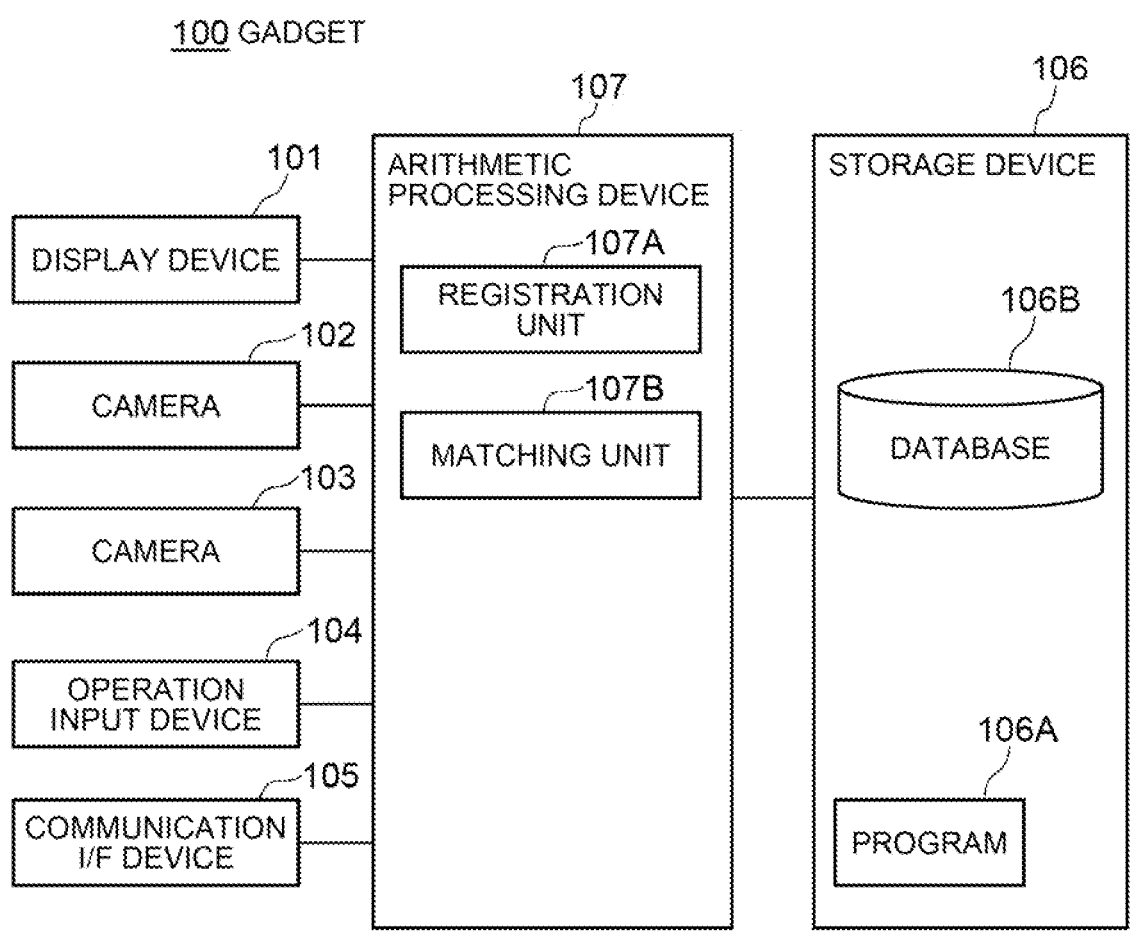
FIG. 10 is a block diagram of a gadget according to a second example embodiment of the present invention.

FIG. 10 is a block diagram of a gadget according to this example embodiment. Referring to FIG. 10, a gadget 100 includes a display device 101, cameras 102 and 103, an operation input device 104, a communication I/F device 105, a storage device 106, and an arithmetic processing device 107.

The display device 101, the cameras 102 and 103, the operation input device 104, and the communication I/F device 105 have the same functions as the display device 21, the cameras 22 and 23, the operation input device 24, and the communication I/F device 25 shown in FIG. 3.

The storage device 106 is composed of a storage device such as a hard disk or a memory, and is configured to store process information and a program 106A necessary for various kinds of processing in the arithmetic processing device 107. The program 106A is a program that is loaded to and executed by the arithmetic processing device 107 to realize various processing units, and is previously loaded from an external device (not shown) or a storage medium (not shown) via a data input/output function such as the communication I/F device 105 and stored into the storage device 106. Major process information stored in the storage device 106 is a database 106B.

The database 106B is configured to store an image of a QR code and an image of a dot having a random pattern so that the images are associated with each other in the same manner as the database 34B of FIG. 4.

The arithmetic processing device 107 has a microprocessor such as a CPU and its peripheral circuits, and is configured to load the program 106A from the storage device 106 and execute to make the above hardware and the program 106A cooperate and realize various processing units. Major processing units realized by the arithmetic processing device 107 are a registration unit 107A and a matching unit 107B.

The registration unit 107A is configured to capture a QR code by using the camera 102. Moreover, the registration unit 107A is configured to extract an image of the QR code from the image captured by the camera 102. Moreover, the registration unit 107A is configured to capture a dot having a random pattern on an object by using the camera 103. Moreover, the registration unit 107A is configured to extract an image of the dot having the random pattern from the image captured by the camera 103. Moreover, the registration unit 107A is configured to register the extracted QR code image and dot image into the database 106B so that the images are associated with each other.

The matching unit 107B is configured to capture a dot having a random pattern on an object by using the camera 103. Moreover, the matching unit 107B is configured to extract an image of the dot having the random pattern from the image captured by the camera 103. Moreover, the matching unit 107B is configured to match the extracted dot image against the dot images stored in the database 106B. Moreover, the matching unit 107B is configured to display, on the display device 101, a QR code image associated with a matched-up dot image and stored in the database 106B.

The gadget 100 has the same appearance as the gadget 2 shown in FIGS. 2A and 2B. Moreover, the gadget 100 has the same registration button 24-1, the matching button 24-2, and the OK button 24-3 as those of the gadget 2.

Next, an operation of the gadget 100 according to this example embodiment will be described. The operation of the gadget 100 is roughly divided into a registration operation and a matching operation. The registration operation is an operation to capture an image of a QR code to be associated with an object and an image of a dot drawn on the object with an ink pen by an operator by using the cameras 102 and 103 of the gadget 100, and associate the images with each other and store into the database 106B. The matching operation is an operation to capture an image of a dot drawn on an object with an ink pen by using the camera 103 of the gadget 100, and acquire an image of a QR code associated with the image of the dot from the database 106B and display on the display device 101.

Figure 11:
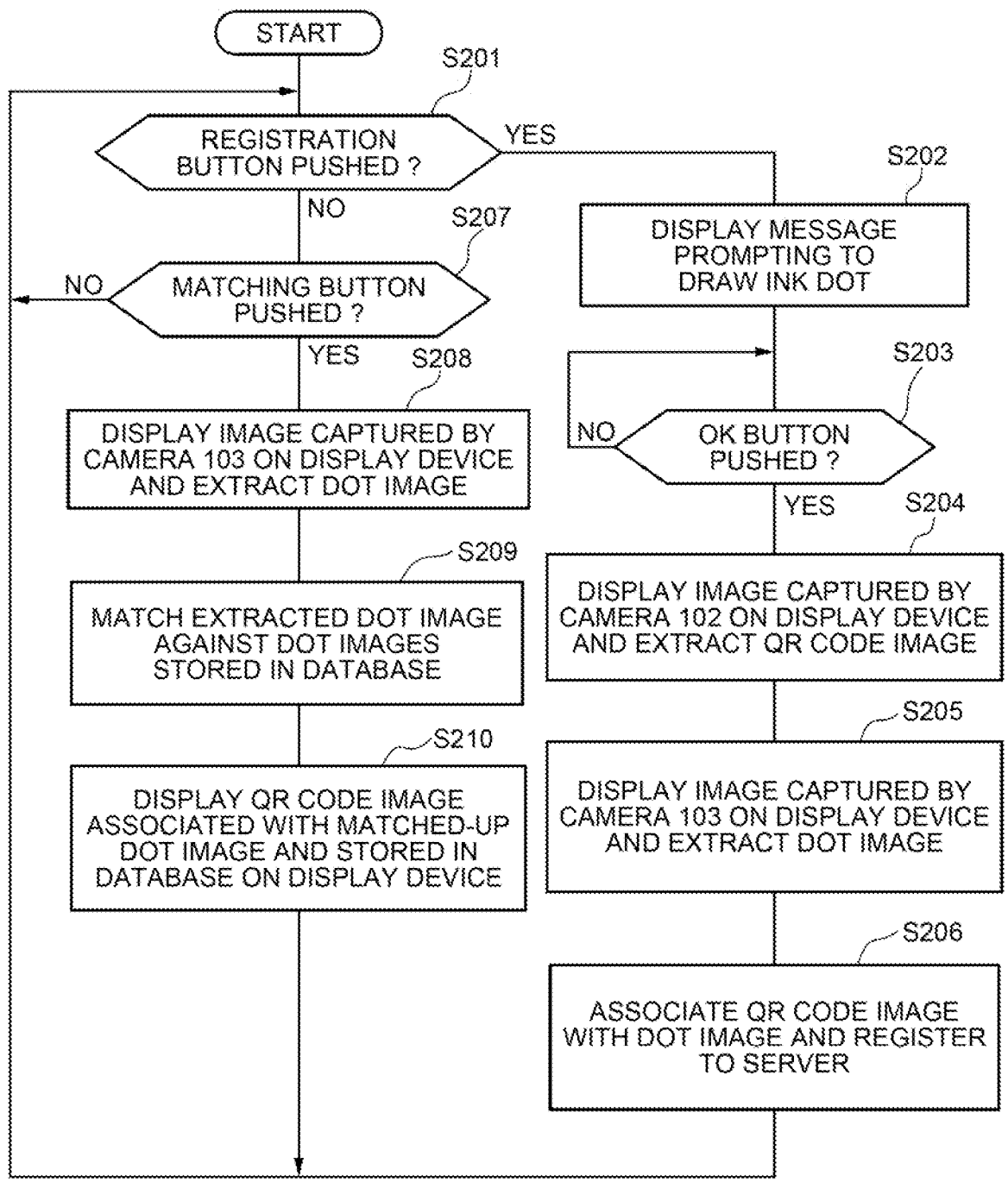
FIG. 11 is a flowchart showing an example of an operation of the gadget according to the second example embodiment of the present invention.

FIG. 11 is a flowchart showing an example of the operation performed by the gadget 100. Below, the registration operation and the matching operation of the gadget 100 according to this example embodiment will be described with reference to FIG. 11.

The registration operation will be described first. When the operator pushes the registration button 24-1 of the gadget 100 (step S201, YES), the following process is started by the registration unit 107A.

Figure 12:
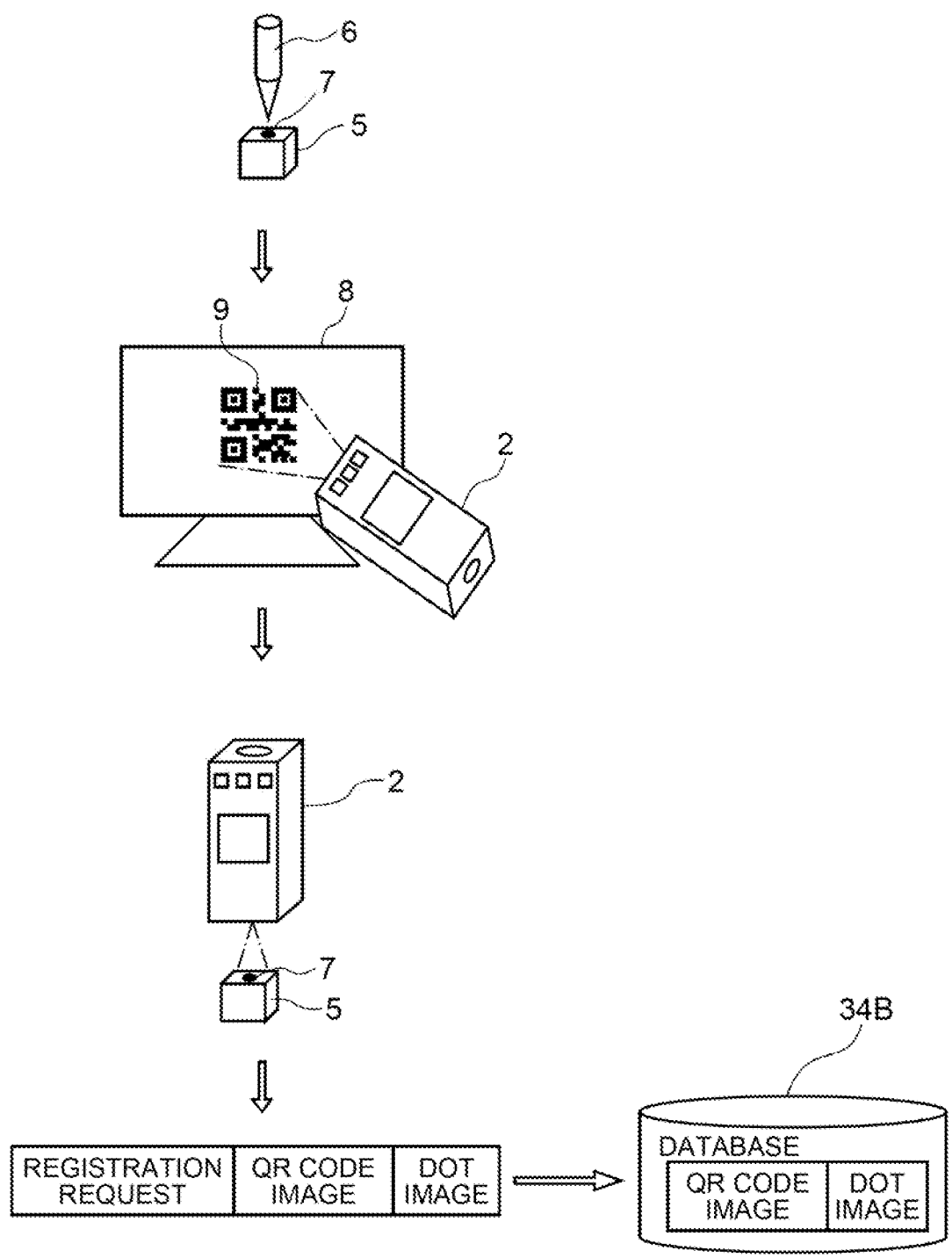
FIG. 12 is a view showing an outline of an operation in a registration mode of the gadget according to the second example embodiment of the present invention.

First, the registration unit 107A displays a message on the display device 101 prompting to draw a dot on an object to be associated with a QR code by using an ink pen (step S202), and waits for the OK button 24-3 to be pushed (step S203). A specific ink pen such as a commercially available pen including glitter powder is attached to the gadget 100. As shown in FIG. 12, the operator uses the ink pen 6 to draw the dot 7 on the surface of the object 5.

Next, when the operator pushes the OK button 24-3, the registration unit 107A activates the camera 102, displays an image being captured by the camera 102 on a monitor of the display device 101, and extracts an image of a QR code from the captured image (step S204). As a QR code to be associated with the object 5, for example, as shown in FIG. 12, the QR code 9 displayed on the screen of the personal computer 8 can be used. As shown in FIG. 12, when the operator turns the camera view of the camera 102 of the gadget 100 to the screen of the personal computer 8, the QR code 9 displayed on the screen of the personal computer is captured by the camera 102, and an image of the QR code 9 is extracted from the captured image by pattern matching.

When finishing extraction of the QR code, the registration unit 107A stops the camera 102, activates the camera 103, displays an image being captured by the camera 103 on the monitor of the display device 101, and extracts an image of a dot drawn with the ink pen from the captured image (step S205). As shown in FIG. 12, when the operator turns the camera view of the camera 103 of the gadget 100 to the dot 7 drawn on the surface of the object 5, the dot 7 is captured by the camera 103, and an image of the dot 7 is extracted from the captured image by pattern matching.

When finishing extraction of the dot image, the registration unit 107A stops the camera 23 and, as shown in FIG. 12, associates the extracted QR code image and dot image and register into the database 106B (step S206).

Thus, in the registration mode, an image of the QR code 9 and an image of the dot 7 drawn with the ink pen 6 on the surface of the object 5 are associated with each other and registered into the database 106B.

Next, the matching operation will be described. When the operator pushes the matching button 24-2 of the gadget 100 (step S207, YES), the following process is started by the matching unit 107B.

Figure 13:
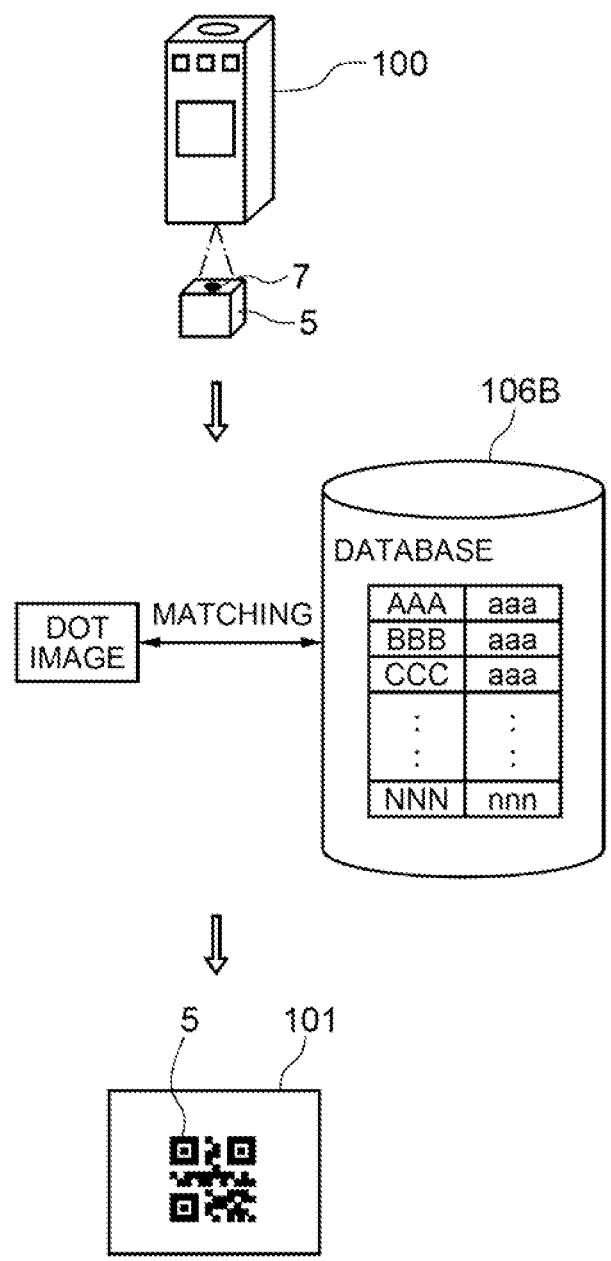
FIG. 13 is a view showing an outline of an operation in a matching mode of the gadget according to the second example embodiment of the present invention.

First, the matching unit 107B activates the camera 103, displays an image being captured by the camera 103 on the monitor of the display device 101, and extracts an image of a dot drawn with the ink pen from the captured image (step S208). As shown in FIG. 13, when the operator turns the camera view of the camera 103 of the gadget 100 to the dot 7 drawn on the surface of the object 5, an image of the dot 7 is captured by the camera 103, and the image of the dot 7 is extracted from the captured image by pattern matching.

When finishing extraction of the image of the dot 7, the matching unit 107B stops the camera 103 and, as shown in FIG. 13, matches the extracted image of the dot 7 against all the dot images stored in the database 106B (step S209). Next, the matching unit 107B extracts an image of the QR code 9 stored in association with a matched-up dot image from the database 106B and, as shown in FIG. 13, displays the image of the QR code 9 on the display device 21 (step S210). In a case where there is no matched-up dot image is in the database 106B, the matching unit 107B displays a message that there is no corresponding QR code on the display device 101, for example.

Thus, in the matching mode, the dot 7 on the object 5 is converted into the QR code 9 and displayed on the display device 101 of the gadget 100.

As described above, according to this example embodiment, even if the object 5 is an object to which the QR code 9 cannot be attached, it is possible to associate the object 5 with the QR code 9. The reason is that an image of the QR code 9 and an image of the dot 7 drawn with the ink pen 6 on the surface of the object 5 are associated with each other and registered in the database 106B in the registration mode, and the dot 7 on the object 5 is converted into the QR code 9 and displayed on the display device 101 in the matching mode.

Further, according to this example embodiment, it is possible to accurately associate the object 5 with the QR code 9 for the same reason as in the first example embodiment.

Further, according to this example embodiment, it is possible to associate the object 5 with the QR code 9 by the gadget 100 alone.

Third Example Embodiment

Figure 14:
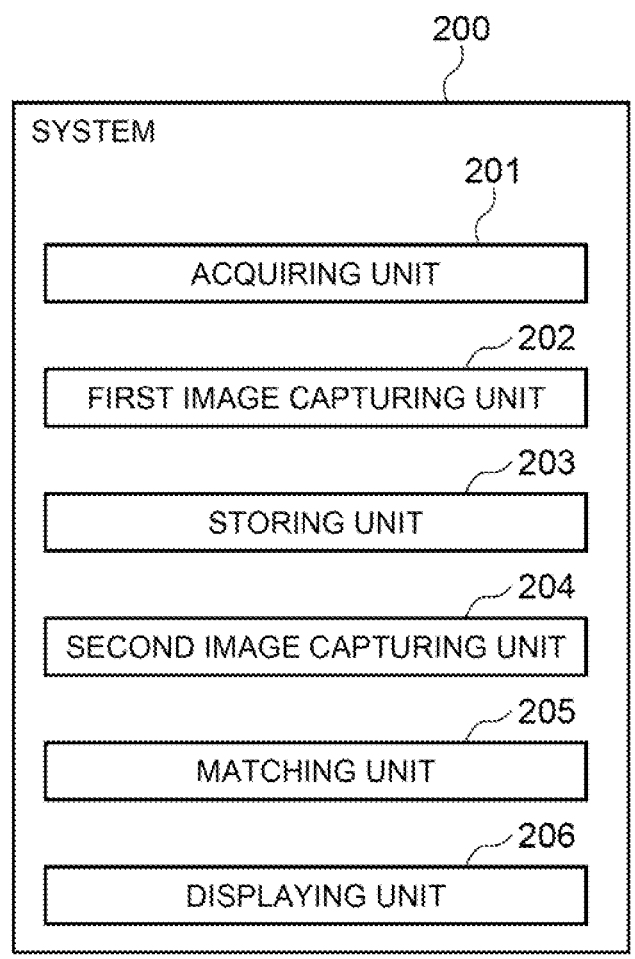
FIG. 14 is a block diagram of a third example embodiment.

Next, a third example embodiment of the present invention will be described in detail with reference to the drawings. FIG. 14 is a block diagram of a system according to this example embodiment. Referring to FIG. 14, a system 200 is a system that associates an object with an n-dimensional symbol. For this, the system 200 includes an acquiring unit 201, a first image capturing unit 202, a storing unit 203, a second image capturing unit 204, a matching unit 205, and a displaying unit 206.

The acquiring unit 201 is configured to acquire an image of an n-dimensional symbol. The first image capturing unit 202 is configured to capture an image of a random pattern on the surface of an object. The storing unit 203 is configured to store the image of the n-dimensional symbol and a first image that is the image of the random pattern captured by the first image capturing unit 202 in a manner that the images are associated with each other. The second image capturing unit 204 is configured to capture an image of a random pattern on the surface of an object. The matching unit 205 is configured to match the image captured by the second image capturing unit 204 against the first images stored by the storing unit 203. The displaying unit 206 is configured to display an image of an n-dimensional symbol associated with the first image stored by the storing unit 203 based on the result of the matching.

The system 200 according to this example embodiment thus configured operates in the following manner. The acquiring unit 201 acquires an image of an n-dimensional symbol. The first image capturing unit 202 captures an image of a random pattern on the surface of an object. The storing unit 203 stores the image of the n-dimensional symbol and a first image that is the image of the pattern captured by the first image capturing unit 202 in a manner that the images are associated with each other. The second image capturing unit 204 captures an image of a random pattern on the surface of an object. The matching unit 205 matches the image captured by the second image capturing unit 204 against the first images stored by the storing unit 203. The displaying unit 206 displays an image of an n-dimensional symbol associated with the first image stored by the storing unit 203 based on the result of the matching.

Thus, the system 200 according to this example embodiment makes it possible to associate an object with an n-dimensional symbol even if the object is an object to which an n-dimensional symbol cannot be attached. The reason is that an image of an n-dimensional symbol and an image of a random pattern on the surface of an object are associated with each other and registered into the storing unit 203 and, in matching, an image of a pattern on an object is converted into an n-dimensional symbol and displayed on the displaying unit 206.

Although the present invention has been described above with reference to the example embodiments, the present invention is not limited to the above example embodiments. The configurations and details of the present invention can be changed in various manners that can be understood by one skilled in the art within the scope of the present invention.

Figure 15:
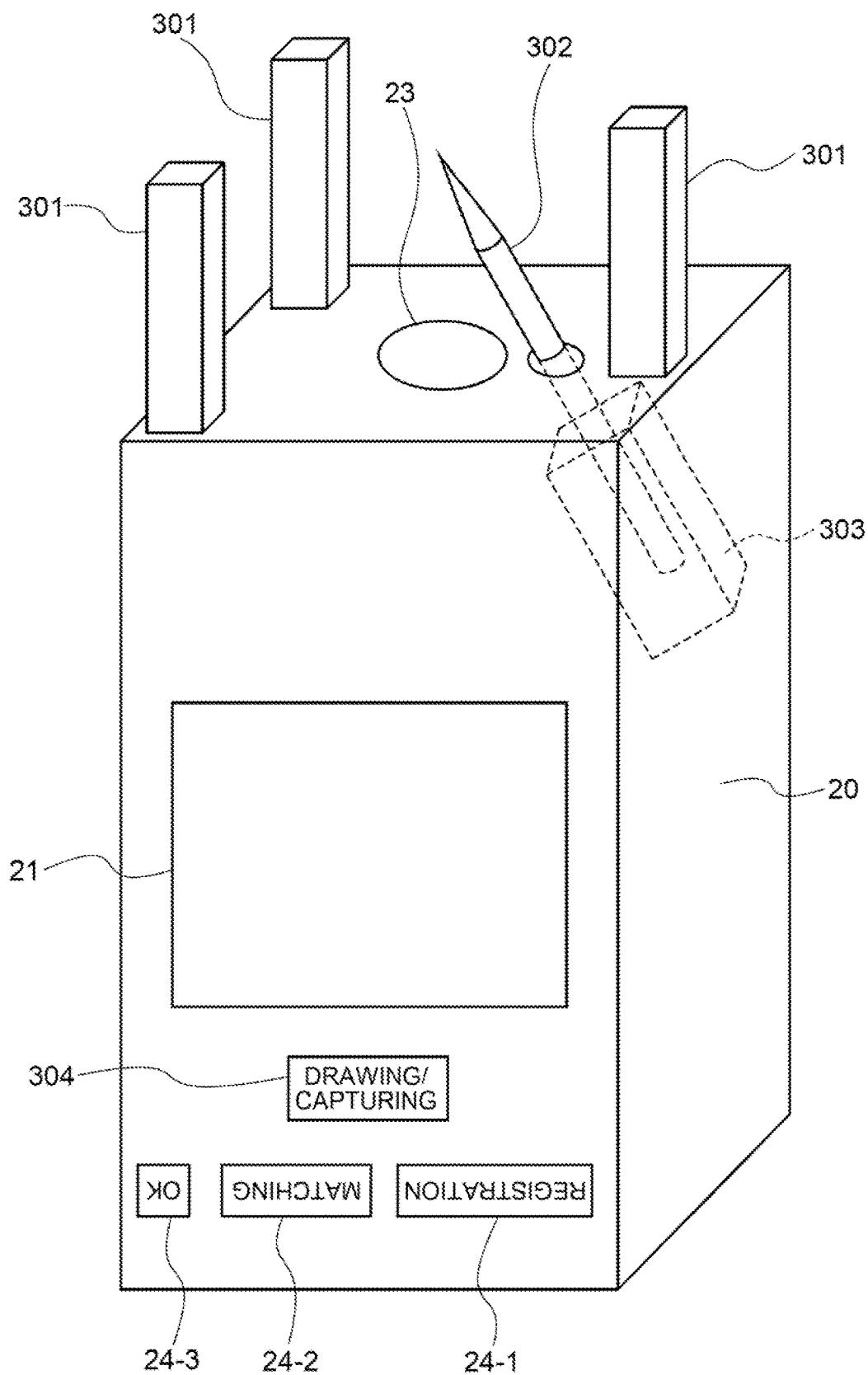
FIG. 15 is an external perspective view of a gadget according to a fourth example embodiment of the present invention.

For example, as shown in FIG. 15, a gadget 2 may have a housing 20 that is provided with a jig 301 capable of keeping a distance to an ink point on an object equal with respect to the focal point of a camera and a mechanism 303 moving an ink pen 302 up and down, and the gadget 2 may be configured to automatically execute the following operations (1) to (3) when a button 304 formed on the housing 20 is operated or the jig is pushed against an object:

(1) write a dot on the surface of an object with the ink pen 302;

(2) wait for a predetermined time until the ink dot dries (notify the user not to move the gadget by display or voice if necessary); and (3) after waiting, capture an image of the ink dot with the camera and, when image capture ends, notify the user by display or voice that the gadget may be moved.

FIG. 15 shows a state in which the pen tip of the ink pen 302 extends to the vicinity of the focal point of the camera. After the ink dot is drawn, the ink pen 302 is held in the housing 20 by the mechanism 303. The ink pen 302 is moveable for replacement.

The present invention can be utilized in all fields of associating an object such as a part or a product with an n-dimensional symbol indicating information about the object. For example, it is possible to attach manufacture management and distribution sales data to a small part, attach an image such as a QR code output by an external management system to an object via an image of a dot, or attach an image of a QR code or the like indicating product information registered on an EC (electronic commerce) site or the like to an object via an image of a dot, and sell and send such objects.

The whole or part of the example embodiments disclosed above can be described as, but not limited to, the following supplementary notes.

[Supplementary Note 1]

A system comprising:

an acquiring unit configured to acquire an image of an n-dimensional symbol;

a first image capturing unit configured to capture an image of a random pattern on a surface of an object;

a storing unit configured to store the image of the n-dimensional symbol and a first image that is the image of the random pattern captured by the first image capturing unit in a manner that the images are associated with each other;

a second image capturing unit configured to capture an image of a random pattern on a surface of an object;

a matching unit configured to perform matching of the image captured by the second image capturing unit against the first image stored by the storing unit; and a displaying unit configured to display the image of the n-dimensional symbol associated with the first image stored by the storing unit based on a result of the matching.

[Supplementary Note 2]

The system according to Supplementary Note 1, wherein the storing unit is provided on cloud.

[Supplementary Note 3]

The system according to Supplementary Note 1 or 2, further comprising a processing unit configured to transmit a registration request including the image of the n-dimensional symbol and the image of the pattern captured by the first image capturing unit.

[Supplementary Note 4]

The system according to any one of Supplementary Notes 1 to 3, wherein the displaying unit is configured to display a message prompting to draw a dot on an object as the random pattern on the surface of the object by using a writing implement.

[Supplementary Note 5]

The system according to any one of Supplementary Notes 1 to 4, wherein the acquiring unit is configured to acquire an image of a display screen on which the image of the n-dimensional symbol is displayed and extract the image of the n-dimensional symbol from the acquired image of the display screen.

[Supplementary Note 6]

A method comprising:

acquiring an image of an n-dimensional symbol;

acquiring an image obtained by capturing a random pattern provided on a surface of an object;

registering the image of the n-dimensional symbol and a first image that is the image of the pattern in a manner that the images are associated with each other;

acquiring an image obtained by capturing a random pattern provided on a surface of an object as a second image;

performing matching of the acquired second image against the registered first image; and displaying the registered image of the n-dimensional symbol associated with the first image that matches the acquired second image on a displaying unit.

[Supplementary Note 7]

The method according to Supplementary Note 6, comprising executing a process of the registering on cloud.

[Supplementary Note 8]

The method according to Supplementary Note 6 or 7, comprising:

transmitting a registration request including the image of the n-dimensional symbol and the image obtained by capturing the random pattern provided on the surface of the object to a server; and executing the process of the registering in the server.

[Supplementary Note 9]

The method according to any one of Supplementary Notes 6 to 8, comprising:

transmitting the image obtained by capturing the random pattern provided on the surface of the object to a server; and executing a process of the matching in the server.

[Supplementary Note 10]

The method according to any one of Supplementary Notes 6 to 9, wherein the random pattern provided on the surface of the object is a dot drawn in ink on the object.

[Supplementary Note 11]

The method according to any one of Supplementary Notes 6 to 10, comprising displaying a message prompting to draw the pattern on the object.

[Supplementary Note 12]

The method according to any one of Supplementary Notes 6 to 11, wherein, in the acquiring the image of the n-dimensional symbol, an image of a display screen on which the image of the n-dimensional symbol is displayed is captured, and the image of the n-dimensional symbol is extracted from the captured image of the display screen.

[Supplementary Note 13]

A non-transitory computer-readable recording medium on which a program is recorded, the program comprising instructions for causing a computer to execute:

a process of acquiring an image of an n-dimensional symbol;

a process of acquiring an image obtained by capturing a random pattern provided on a surface of an object;

a process of registering the image of the n-dimensional symbol and a first image that is the image of the pattern in a manner that the images are associated with each other;

a process of acquiring an image obtained by capturing a random pattern provided on a surface of an object as a second image;

a process of matching the acquired second image against the registered first image; and a process of displaying the image of the n-dimensional symbol registered in association with the first image that matches the acquired second image on a displaying unit.

DESCRIPTION OF NUMERALS 1 system
2 gadget
3 server
4 network
5 object
6 ink pen
7 dot
8 personal computer
9 QR code
20 housing
21 display device
22 camera
23 camera
24 operation input device
24-1 registration button
24-2 matching button
24-3 OK button
25 communication I/F device
26 storage device
26A program
27 arithmetic processing device
27A registration unit
27B matching unit
31 communication I/F device
32 operation input device
33 display device
34 storage device
34A program
34B database
35 arithmetic processing device
35A registration unit
35B matching unit
100 gadget
101 display device
102 camera
103 camera
104 operation input device
105 communication I/F device
106 storage device
106A program
106B database
107 arithmetic processing device
107A registration unit
107B matching unit
200 system
201 image capturing unit
202 image capturing unit
203 displaying unit
204 storing unit
205 processing unit

The invention claimed is:

1. A system comprising:

a memory containing program instructions; and a processor coupled to the memory, wherein the processor is configured to execute the program instructions to:

capture an image of an n-dimensional symbol displayed on a screen of a computer by using a first camera;

capture an image of a random first pattern on a surface of an object by using a second camera;

store the image of the n-dimensional symbol and the image of the first pattern into a storage in a manner that the images are associated with each other;

capture an image of a random second pattern on a surface of an object by using a third camera;

perform matching of the image of the second pattern against the image of the first pattern stored in the storage; and display the image of the n-dimensional symbol associated with the image of the first pattern stored in the storage on a display device based on a result of the matching.

2. The system according to claim 1, wherein the storage is provided on cloud.

3. The system according claim 1, wherein the process is further configured to transmit a registration request including the image of then-dimensional symbol and the image of the first pattern.

4. The system according to claim 1, wherein the processor is further configured to display a message prompting to draw a dot on an object as the first pattern by using a writing implement on the display device.

5. The system according to claim 1, wherein the computer is configured to generate the n-dimensional symbol from text by using software and display the generated n-dimensional symbol on the screen.

6. The system according to claim 1, wherein the image captured by using the first camera does not include the first pattern, and the image captured by using the second camera does not include the image of the n-dimensional symbol.

7. A method comprising:

capturing an image of an n-dimensional symbol displayed on a screen of a computer by using a first camera;

capturing an image of a random first pattern provided on a surface of an object by using a second camera;

storing the image of the n-dimensional symbol and the image of the first pattern into a storage in a manner that the images are associated with each other;

capturing an image of a random second pattern provided on a surface of an object by using a third camera;

performing matching of the image of the second pattern against the image of the first pattern stored in the storage; and displaying the image of the n-dimensional symbol stored in the storage in association with the image of the first pattern that matches the image of the second pattern on a display device.

8. The method according to claim 7, wherein the storage is provided on cloud.

9. The method according to claim 7, comprising:

transmitting a registration request including the image of the n-dimensional symbol and the image of the first pattern to a server; and executing a process of the storing in the server.

10. The method according to any one of claim 7, comprising:

transmitting the image of the second pattern to a server; and executing a process of the matching in the server.

11. The method according to claim 7, wherein the first pattern and the second pattern are dots drawn in ink on the object.

12. The method according to claim 7, further comprising displaying a message prompting to draw the first pattern on the object on the display device.

13. The method according to claim 7, wherein the computer generates the n-dimensional symbol from text by using software and displays the generated n-dimensional symbol on the screen.

14. The method according to claim 7, wherein the image captured by using the first camera does not include the first pattern, and the image captured by using the second camera does not include the image of the n-dimensional symbol.

15. A non-transitory computer-readable recording medium on which a program is recorded, the program comprising instructions for causing a computer to execute:

a process of capturing an image of an n-dimensional symbol displayed on a screen of a computer by using a first camera;

a process of capturing an image of a random first pattern provided on a surface of an object by using a second camera;

a process of storing the image of the n-dimensional symbol and the image of the first pattern in a manner that the images are associated with each other;

a process of capturing an image of a random second pattern provided on a surface of an object by using a third camera;

a process of matching the image of the second pattern against the image of the first pattern; and a process of displaying the image of the n-dimensional symbol stored in the storage in association with the image of the first pattern that matches the image of the second pattern on a display device.

* * * * *